(12) United States Patent
Su et al.

(10) Patent No.: US 8,874,366 B2
(45) Date of Patent: Oct. 28, 2014

(54) FIRST WAYPOINT DISTANCE

(75) Inventors: Chien-Wen Danny Su, Richmond Hill (CA); Aarti Bharathan, Sunnyvale, CA (US); Mudassir Alam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 222 days.

(21) Appl. No.: 13/288,784

(22) Filed: Nov. 3, 2011

(65) Prior Publication Data

US 2012/0303266 A1 Nov. 29, 2012

Related U.S. Application Data

(60) Provisional application No. 61/489,096, filed on May 23, 2011.

(51) Int. Cl.
*G06F 17/00* (2006.01)
*G01C 21/34* (2006.01)

(52) U.S. Cl.
CPC ............................. *G01C 21/3476* (2013.01)
USPC ............ 701/420; 701/2; 701/202; 701/421; 700/245; 370/238; 370/310; 370/331

(58) Field of Classification Search
USPC ............... 701/2, 202, 421; 700/245; 370/238, 370/310, 331
See application file for complete search history.

(56) References Cited

U.S. PATENT DOCUMENTS

| | | | |
|---|---|---|---|
| 5,712,788 A | 1/1998 | Liaw et al. | |
| 5,835,881 A | 11/1998 | Trovato et al. | |
| 6,084,543 A | 7/2000 | Iizuka | |
| 7,499,798 B2* | 3/2009 | Glaza | 701/421 |
| 7,603,230 B2 | 10/2009 | Suzuki et al. | |
| 7,808,939 B2* | 10/2010 | Bansal et al. | 370/310 |
| 7,831,387 B2 | 11/2010 | Golding et al. | |
| 7,848,876 B2 | 12/2010 | Simonds et al. | |
| 8,325,612 B1* | 12/2012 | Ruiz et al. | 370/238 |
| 2003/0208313 A1 | 11/2003 | Wells et al. | |
| 2006/0190164 A1* | 8/2006 | Glaza | 701/202 |
| 2007/0058588 A1* | 3/2007 | Fashandi et al. | 370/331 |

(Continued)

OTHER PUBLICATIONS

Definition of 'telematics' from netlingo.com, 1 page, printed on Jul. 8, 2013.*

(Continued)

*Primary Examiner* — James Trammell
*Assistant Examiner* — Sanjeev Malhotra
(74) *Attorney, Agent, or Firm* — Bryan Webster; Kate Drakos; Micky Minhas

(57) ABSTRACT

A mobile computing device can determine a first waypoint distance that indicates a distance from the device's location within which a first waypoint of a route cannot be located. This distance can be sent to a server as part of a map data request. The distance can be based on a device velocity, a request latency time, an instruction intake time and an instruction reaction time. The request latency time represents the delay from sending a request to receiving route information in response. The instruction intake time represents the time it takes for a user to read or listen to a first waypoint instruction. The instruction reaction time represents the time it takes a user to react to a first waypoint instruction. Route information contains information identifying a first waypoint that is further away from the device position supplied with the request than the first waypoint distance.

19 Claims, 10 Drawing Sheets

(56) References Cited

U.S. PATENT DOCUMENTS

| | | | |
|---|---|---|---|
| 2007/0156286 A1* | 7/2007 | Yamauchi | 700/245 |
| 2008/0027590 A1* | 1/2008 | Phillips et al. | 701/2 |
| 2008/0027643 A1 | 1/2008 | Basir et al. | |
| 2011/0106339 A1* | 5/2011 | Phillips et al. | 701/2 |
| 2011/0280219 A1* | 11/2011 | Fashandi et al. | 370/331 |

OTHER PUBLICATIONS

Wang et al., "An Unified Vehicle Supervising and Traffic Information System," Seventh IEEE Int'l Symposium on Personal, Indoor and Mobile Radio Communications, 1996 (PIMRC'96), vol. 3, pp. 968-972.

* cited by examiner

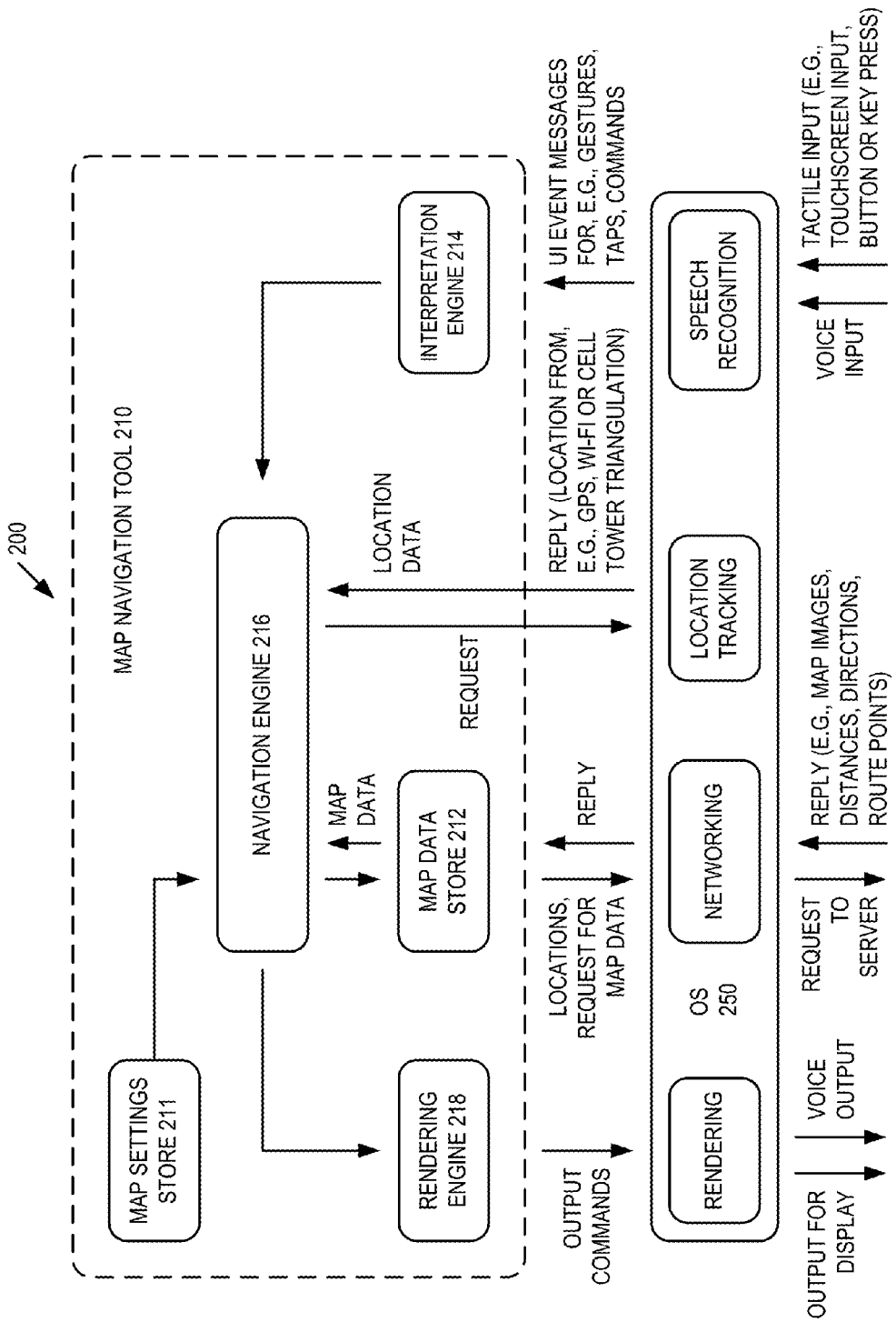

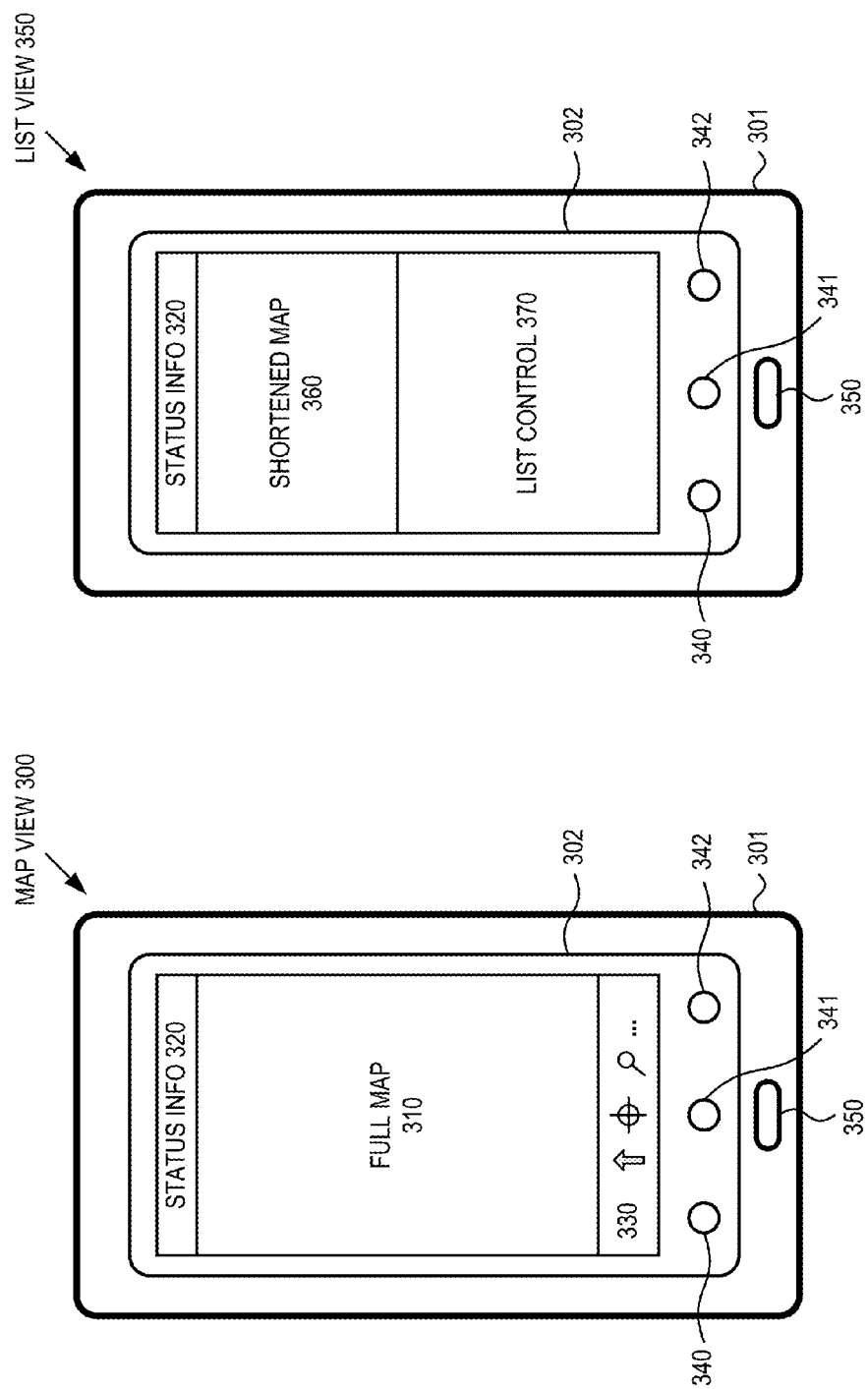

FIRST WAYPOINT DISTANCE

CROSS REFERENCE TO RELATED APPLICATIONS

This application claims priority to U.S. Patent Application No. 61/489,096, filed on May 23, 2011, which is incorporated herein by reference.

BACKGROUND

Computer-aided map navigation tools have achieved widespread acceptance. A user can locate a destination or obtain directions to a destination with various map navigation tools. Some software programs allow a user to navigate over a map, zooming in towards the ground or zooming out away from the ground, or moving between different geographical positions. In cars, GPS devices have provided rudimentary road navigation for years. More recently, map navigation software for cellular telephones and other mobile computing devices has allowed users to zoom in, zoom out, and move around a map that shows details about geographical features, town, city, county and state locations, roads, and buildings. These maps can be overlaid with routes that direct a user from their position to a selected destination.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one aspect of the techniques and tools described herein, a mobile device requests a route from its location to a destination from a remote map server. The request comprises the device's location, information identifying the destination and a first waypoint distance. The first waypoint distance is based on the velocity of the device, a request latency time (the amount of time the device waits to receive a route after sending the request), an instruction intake time (the amount of time it takes for a user to listen to or read the first instruction in a route) and an instruction reaction time (the amount of time it takes for the user to react to the first instruction). The first waypoint in the route returned from the server is further away from the device location supplied with route request than the first waypoint distance.

According to another aspect of the techniques and tools described herein, the request latency time, instruction intake time and instruction reaction time can be variable. The request latency time can be based on an actual amount of time it takes the device to receive a route from a prior request. The instruction intake time can vary based on instruction length. The instruction reaction time can be varied according to factors such as the time of day, mobile device velocity, weather conditions, traffic conditions and road conditions.

The foregoing and other objects, features, and advantages of the invention will become more apparent from the following detailed description, which proceeds with reference to the accompanying figures.

BRIEF DESCRIPTION OF THE DRAWINGS

FIG. 2 is a block diagram illustrating an example software architecture for a map navigation tool that renders map views and list views.

FIGS. 3A and 3B are diagrams illustrating features of a generalized map view and generalized list view rendered using a map navigation tool.

DETAILED DESCRIPTION

As used in this application and in the claims, the singular forms "a," "an," and "the" include the plural forms unless the context clearly dictates otherwise. Similarly, the word "or" is intended to include "and" unless the context clearly indicates otherwise. The term "comprising" means "including;" hence, "comprising A or B" means including A or B, as well as A and B together. Additionally, the term "includes" means "comprises."

Example Mobile Computing Device

Figure 1:
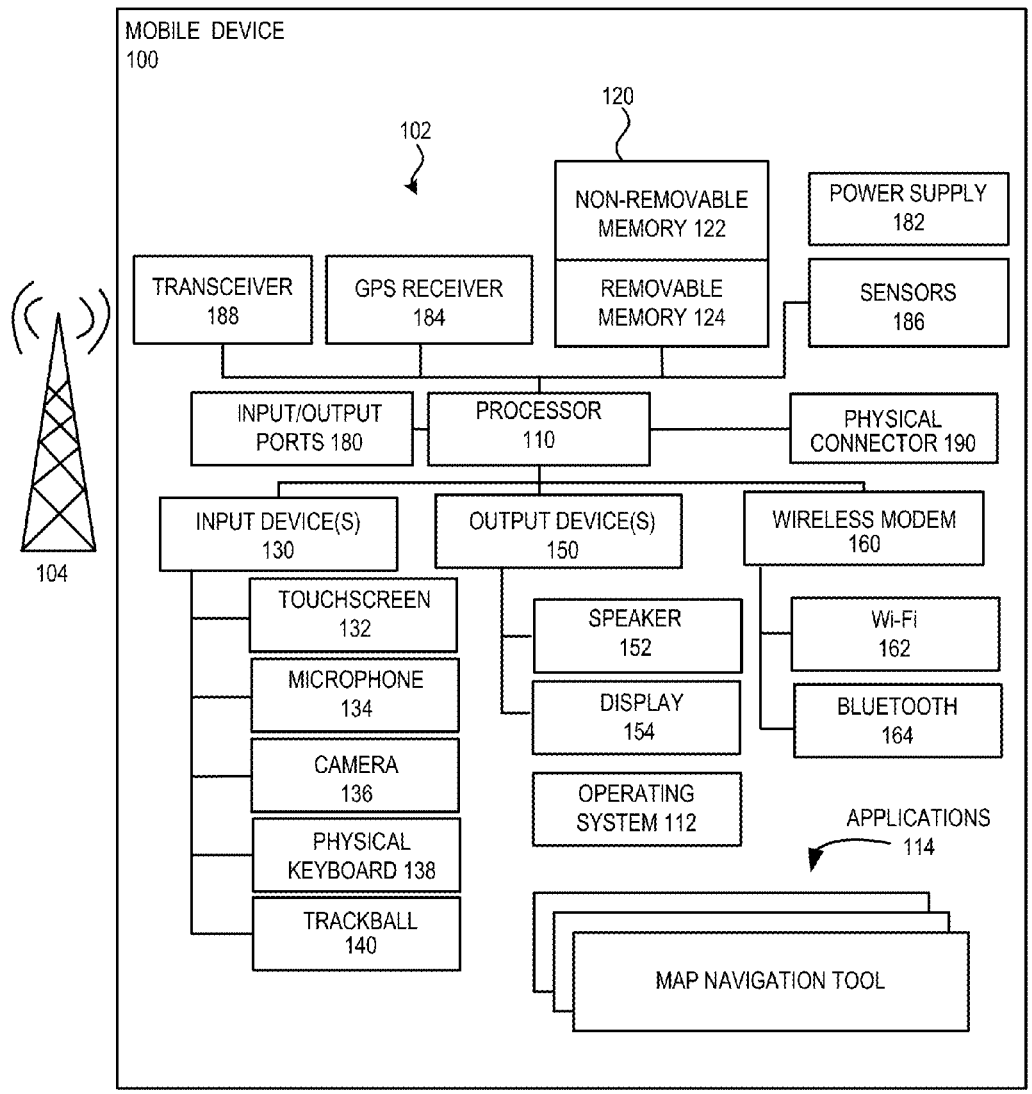
FIG. 1 is a block diagram of a mobile computing device capable of implementing the techniques and solutions described herein.

FIG. 1 is a block diagram of a mobile computing device 100 capable of implementing the techniques and solutions described herein. The mobile device 100 includes a variety of optional hardware and software components, shown generally at 102. In general, a component 102 in the mobile device 100 can communicate with any other component of the device, although not all connections are shown, for ease of illustration. The mobile device 100 can be any of a variety of computing devices (e.g., cell phone, smartphone, handheld computer, laptop computer, notebook computer, tablet device, slate device, media player, Personal Digital Assistant (PDA), camera, video camera, etc.) and can allow wireless two-way communications with one or more mobile communications networks 104, such as a Wi-Fi, cellular, or satellite network.

The illustrated mobile device 100 includes a controller or processor 110 (e.g., signal processor, microprocessor, ASIC, or other control and processing logic circuitry) for performing such tasks as signal coding, data processing, input/output processing, power control, and/or other functions. An operating system 112 controls the allocation and usage of the components 102 and support for one or more application programs 114 such as a map navigation tool that implements one or more of the innovative features described herein. In addition to map navigation software, the application programs can include common mobile computing applications (e.g., telephony applications, email applications, calendars, contact managers, web browsers, messaging applications), or any other computing application.

The illustrated mobile device 100 includes memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in Global System for Mobile Communications (GSM) communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be sent to a network server to identify users and equipment.

The mobile device 100 can support one or more input devices 130, such as a touch screen 132 (e.g., capable of capturing finger tap inputs, finger gesture inputs, or keystroke inputs for a virtual keyboard or keypad), microphone 134 (e.g., capable of capturing voice input), camera 136 (e.g., capable of capturing still pictures and/or video images), physical keyboard 138, buttons and/or trackball 140 and one or more output devices 150, such as a speaker 152 and a display 154. Other possible output devices (not shown) can include piezoelectric or other haptic output devices. Some devices can serve more than one input/output function. For example, touchscreen 132 and display 154 can be combined in a single input/output device.

The mobile device 100 can provide one or more natural user interfaces. For example, the operating system 112 or applications 114 can comprise speech-recognition software as part of a voice user interface that allows a user to operate the device 100 via voice commands. For example, a user's voice commands can be used to provide input to a map navigation tool.

A wireless modem 160 can be coupled to one or more antennas (not shown) and can support two-way communications between the processor 110 and external devices, as is well understood in the art. The modem 160 is shown generically and can include, for example, a cellular modem for communicating at long range with the mobile communication network 104, a Bluetooth-compatible modem 164, or a Wi-Fi-compatible modem 162 for communicating at short range with an external Bluetooth-equipped device or a local wireless data network or router. The wireless modem 160 is typically configured for communication with one or more cellular networks, such as a GSM network for data and voice communications within a single cellular network, between cellular networks, or between the mobile device and a public switched telephone network (PSTN).

The mobile device 100 can further include at least one input/output port 180, a power supply 182, a satellite navigation system receiver 184, such as a Global Positioning System (GPS) receiver, sensors 186 such as an accelerometer, a gyroscope, a compass, or an infrared proximity sensor for detecting the orientation and motion of device 100, and for receiving gesture commands as input, a transceiver 188 (for wirelessly transmitting analog or digital signals) and/or a physical connector 190, which can be a USB port, IEEE 1394 (FireWire) port, and/or RS-232 port. The illustrated components 102 are not required or all-inclusive, as any of the components shown can be deleted and other components can be added.

The mobile device 100 can determine location data that indicates the location of the mobile device 100 based upon information received through the satellite navigation system receiver 184 (e.g., GPS receiver). Alternatively, the mobile device 100 can determine location data that indicates location of the mobile device 100 in another way. For example, the location of the mobile device 100 can be determined by triangulation between cell towers of a cellular network. Or, the location of the mobile device 100 can be determined based upon the known locations of Wi-Fi routers in the vicinity of the mobile device 100. The location data can be updated every second or on some other basis, depending on implementation and/or user settings. Regardless of the source of location data, the mobile device 100 can provide the location data to the map navigation tool for use in map navigation. For example, the map navigation tool periodically requests, or polls for, current location data through an interface exposed by the operating system 112 (which in turn may get updated location data from another component of the mobile device), or the operating system 112 pushes updated location data through a callback mechanism to any application (such as the map navigation tool) that has registered for such updates.

With the map navigation tool and/or other software or hardware components, the mobile device 100 implements the technologies described herein. For example, the processor 110 can update a map view and/or list view in reaction to user input and/or changes to the current location of the mobile device 100. The processor 110 can also determine device velocity, determine a first waypoint distance, and send a map data request to a map server. As a client computing device, the mobile device 100 can send requests to a server computing device, and receive map images, distances, directions, other map data, search results or other data in return from the server computing device.

The mobile device 100 can be part of an implementation environment in which various types of services (e.g., computing services) are provided by a computing "cloud." For example, the cloud can comprise a collection of computing devices, which may be located centrally or distributed, that provide cloud-based services to various types of users and devices connected via a network such as the Internet. Some tasks (e.g., processing user input and presenting a user interface) can be performed on local computing devices (e.g., connected devices) while other tasks (e.g., storage of data to be used in subsequent processing) can be performed in the cloud.

Although FIG. 1 illustrates a mobile device 100, more generally, the techniques and solutions described herein can be implemented with devices having other screen capabilities and device form factors, such as a desktop computer, a television screen, or device connected to a television (e.g., a set-top box or gaming console). Services can be provided by the cloud through service providers or through other providers of online services. Thus, the map navigation techniques and solutions described herein can be implemented with any of the connected devices as a client computing device. Similarly, any of various computing devices in the cloud or a service provider can perform the role of a server computing device and deliver map data or other data to the connected devices.

Example Software Architecture for Rendering of Map Data and Directions

FIG. 2 is a block diagram illustrating an example software architecture 200 for a map navigation tool 210 that renders views of a map depending on user input and location data. A client computing device (e.g., smart phone or other mobile computing device) can execute software organized according to the architecture 200 to render map views, list views of directions for a route, or other views.

The architecture 200 includes a device operating system (OS) 250 and map navigation tool 210. In FIG. 2, the device OS 250 includes components for rendering (e.g., rendering visual output to a display, generating voice output for a speaker), components for networking, components for location tracking, and components for speech recognition. The device OS 250 manages user input functions, output functions, storage access functions, network communication functions, and other functions for the device. The device OS 250 provides access to such functions to the map navigation tool 210.

A user can generate user input that affects map navigation. The user input can be tactile input such as touchscreen input, button presses or key presses or voice input. The device OS 250 includes functionality for recognizing taps, finger gestures, etc. to a touchscreen from tactile input, recognizing commands from voice input, button input or key press input, and creating messages that can be used by the map navigation tool 210 or other software. The interpretation engine 214 of the map navigation tool 210 listens for user input (UI) event messages from the device OS 250. The UI event messages can indicate a panning gesture, flicking gesture, dragging gesture, or other gesture on a touchscreen of the device, a tap on the touchscreen, keystroke input, or other UI event (e.g., from voice input, directional buttons, trackball input). If appropriate, the interpretation engine 214 can translate the UI event messages from the OS 250 into map navigation messages sent to a navigation engine 216 of the map navigation tool 210.

The navigation engine 216 considers a current view position (possibly provided as a saved or last view position from the map settings store 211), any messages from the interpretation engine 214 that indicate a desired change in view position, map data and location data. From this information, the navigation engine 216 determines a view position and provides the view position as well as location data and map data in the vicinity of the view position to the rendering engine 218. The location data can indicate a current location (of the computing device with the map navigation tool 210) that aligns with the view position, or the view position can be offset from the current location.

The navigation engine 216 gets current location data for the computing device from the operating system 250, which gets the current location data from a local component of the computing device. For example, the location data can be determined based upon data from a global positioning system (GPS), by triangulation between towers of a cellular network, by reference to physical locations of Wi-Fi routers in the vicinity, or by another mechanism.

The navigation engine 216 gets map data for a map from a map data store 212. In general, the map data can be photographic image data or graphical data (for boundaries, roads, etc.) at various levels of detail, ranging from high-level depiction of states and cities, to medium-level depiction of neighborhoods and highways, to low-level depiction of streets and buildings. Aside from photographic data and graphical data, the map data can include graphical indicators such as icons or text labels for place names of states, cities, neighborhoods, streets, buildings, landmarks or other features in the map. Aside from names, the map data can include distances between features, route points (in terms of latitude and longitude) that define a route between start and end locations, text directions for decisions at waypoints along the route (e.g., turn at NE 148th), and distances between waypoints along the route. The map data can provide additional details for a given feature such as contact information (e.g., phone number, Web page, address), reviews, ratings, other commentary, menus, photos, advertising promotions, or information for games (e.g., geo-caching, geo-tagging). Links can be provided for Web pages, to launch a Web browser and navigate to information about the feature.

The organization of the map data depends on implementation. For example, in some implementations, different types of map data (photographic image data or graphical surface layer data, text labels, icons, etc.) are combined into a single layer of map data at a given level of detail. Up to a certain point, if the user zooms in (or zooms out), a tile of the map data at the given level of detail is simply stretched (or shrunk). If the user further zooms in (or zooms out), the tile of map data at the given level of detail is replaced with one or more other tiles at a higher (or lower) level of detail. In other implementations, different types of map data are organized in different overlays that are composited during rendering, but zooming in and out are generally handled in the same way, with overlapping layers stretched (or shrunk) to some degree, and then replaced with tiles at other layers.

The map data store 212 caches recently used map data. As needed, the map data store 212 gets additional or updated map data from local file storage or from network resources. The device OS 250 mediates access to the storage and network resources. The map data store 212 requests map data from storage or a network resource through the device OS 250, which processes the request, as necessary, requests map data from a server and receives a reply, and provides the requested map data to the map data store 212.

For example, to determine directions for a route, the map navigation tool 210 provides a start location (typically, the current location of the computing device with the map navigation tool 210) and an end location for a destination (e.g., an address or other specific location) as part of a request for map data to the OS 250. The device OS 250 conveys the request to one or more servers, which provide surface layer data, waypoints that define a route, text directions for decisions at waypoints along the route, distances between waypoints along the route, and/or other map data in reply. The device OS 250 in turn conveys the map data to the map navigation tool 210.

As another example, as a user travels along a route, the map navigation tool 210 gets additional map data from the map data store 212 for rendering. The map data store 212 may cache detailed map data for the vicinity of the current location, using such cached data to incrementally change the rendered views. The map navigation tool 210 can pre-fetch map data along the route, or part of the route. Thus, as the rendered map views are updated to account for changes to the current location, the map navigation tool 210 often updates the display without the delay of requesting/receiving new map data from a server. As needed, the map data store 212 requests additional map data to render views.

The rendering engine 218 processes the view position, location data and map data, and renders a view of the map. Depending on the use scenario, the rendering engine 218 can render map data from local storage, map data from a network server, or a combination of map data from local storage and map data from a network server. In general, the rendering engine 218 provides output commands for the rendered view to the device OS 250 for output on a display. The rendering engine 218 can also provide output commands to the device OS 250 for voice output over a speaker or headphones.

The exact operations performed as part of the rendering depend on implementation. In some implementations, for map rendering, the tool determines a field of view and identifies features of the map that are in the field of view. Then, for those features, the tool selects map data elements. This may include any and all of the map data elements for the identified features that are potentially visible in the field of view. Or, it may include a subset of those potentially visible map data elements, which are relevant to the navigation scenario (e.g., directions, traffic). For a given route, the rendering engine 218 graphically connects route points along the route (e.g., with a highlighted color) to show the route and graphically indicates waypoints along the route. The tool composites the selected map data elements that are visible (e.g., not obscured by another feature or label) from the view position. Alternatively, the tool implements the rendering using acts in a different order, using additional acts, or using different acts.

In terms of overall behavior, the map navigation tool 210 can react to changes in the location of the computing device and can also react to user input that indicates a change in view position, a change in the top item in a list of directions for a route, or other change. For example, in response to a finger gesture or button input that indicates a panning instruction on the map, or upon a change to a previous item or next item in a list of directions for a route, the map navigation tool 210 can update the map with a simple, smooth animation that translates (shifts vertically and/or horizontally) the map. Similarly, as the location of the computing device changes, the map navigation tool 210 can automatically update the map with a simple translation animation. (Or, the map navigation tool can automatically re-position and re-render an icon that indicates the location of the computing device as the location is updated.) If the change in location or view position is too large to be rendered effectively using a simple, smooth translation animation, the map navigation tool 210 can dynamically zoom out from a first geographic position, shift vertically and/or horizontally to a second geographic position, then zoom in at the second geographic position. Such a dynamic zoom operation can happen, for example, when a phone is powered off then powered on at a new location, when the view position is re-centered to the current location of the device from far away, when the user quickly scrolls through items in a list of directions for a route, or when the user scrolls to a previous item or next item in the list of directions that is associated with a waypoint far from the current view position. The map navigation tool can also react to a change in the type of view (e.g., to switch from a map view to a list view, or vice versa), or a change in details to be rendered (e.g., to show or hide traffic details).

Alternatively, the map navigation tool 210 includes more or fewer modules. A given module can be split into multiple modules, or different modules can be combined into a single layer. For example, the navigation engine can be split into multiple modules that control different aspects of navigation, or the navigation engine can be combined with the interpretation engine 214 and/or the rendering engine 218. Functionality described with reference to one module (e.g., rendering functionality) can in some cases be implemented as part of another module.

Example Map Navigation UI and Screenshots

Figure 4A:
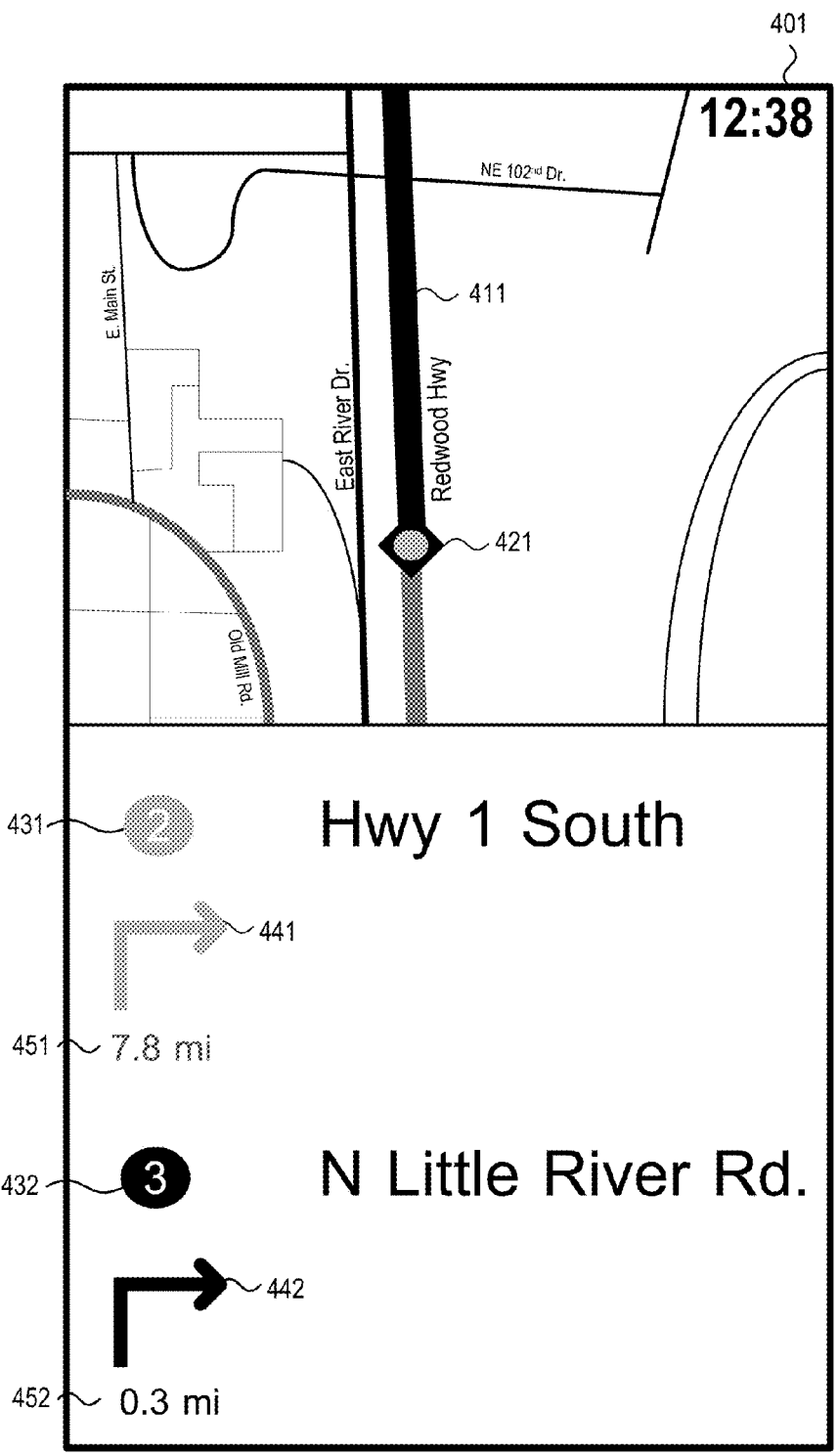
FIG. 4A-4C are diagrams illustrating user interface features of list views rendered using a map navigation tool.
Figure 4B:
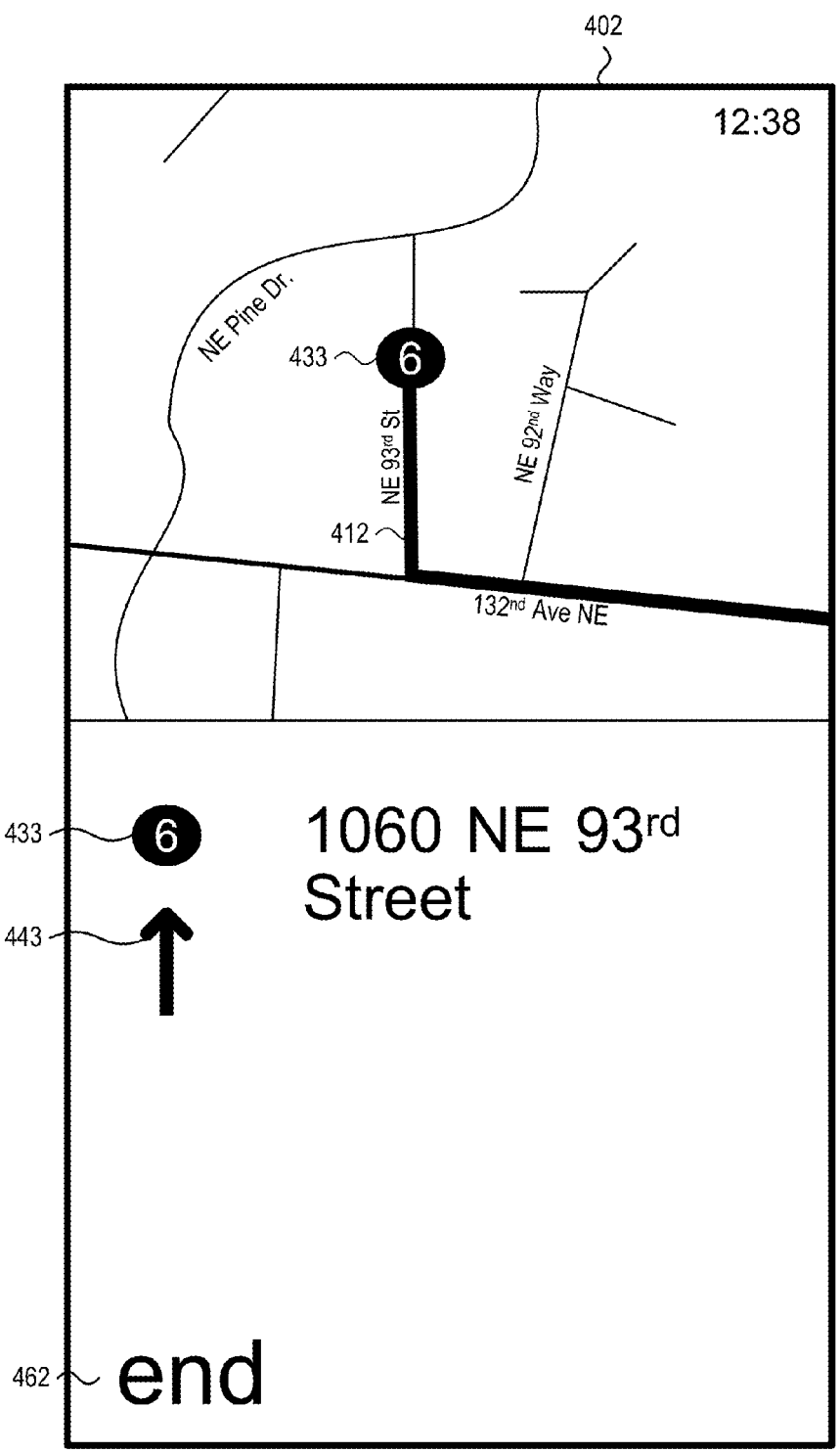
Figure 4C:

FIGS. 3A and 3B illustrate a generalized map view 300 and generalized direction list view 350, respectively, rendered using a map navigation tool of a mobile computing device 301. FIGS. 4A-4C show representations 401, 402, 403 of example screenshots of a list view of a map navigation UI.

The device 301 includes one or more device buttons. FIGS. 3A and 3B show a single device button 350 near the bottom of the device 301. The effect of actuating the device button 350 depends on context. For example, actuation of the device button 350 causes the device 301 to return to a home screen or start screen from the map navigation tool. Alternatively, the device 301 can include no device buttons.

The device 301 of FIGS. 3A and 3B includes a touchscreen 302 with a display area and three touchscreen buttons 340-342. The effect of actuating one of the touchscreen buttons 340-342 depends on context and which button is actuated. For example, one of the touchscreen buttons 340-342 is a search button, and actuation of the search button causes the device 301 to start a Web browser at a search page, start a search menu for contacts or start another search menu, depending on the point at which the search button is actuated. Or, one of the touchscreen buttons 340-342 is a "back" button that can be used to navigate the user interface of the device. Alternatively, the device includes more touchscreen buttons, fewer touchscreen buttons or no touchscreen buttons. The functionality implemented with a physical device button can be implemented instead with a touchscreen button, or vice versa.

In the display area of the touchscreen 302, the device 301 renders views. In FIG. 3A, as part of the map view 300, the device 301 renders a full map 310 and status information 320 that overlays the top of the full map 310. The status information 320 can include time, date, network connection status and/or other information. The device 301 also renders a control section 330 that includes map navigation buttons, which depend on implementation of the map navigation tool. FIG. 3A shows a "directions" button (arrow icon), "center" button (crosshairs icon) and "search" button (magnifying glass icon). Actuation of the "directions" button causes the device 301 to open a menu for keystroke input for a destination location. Actuation of the "center" button causes the device 301 to align the view position over the current location of the device 301. Actuation of the "search" button causes the device 301 to open a menu for keystroke input for a search for a location or locations. Other buttons/controls can be accessed by actuating the ellipses, such as buttons/controls to clear the map of extra data, show/hide photographic image details, show/hide traffic data, show/hide route directions, change settings of the map navigation tool such as whether voice instructions are input or whether orientation of the view changes during progress along the route, etc. Alternatively, the device includes more map navigation buttons, fewer map navigation buttons or no map navigation buttons.

In FIG. 3B, as part of the list view 350, the device 301 renders a shortened map 360, status information 320 that overlays the top of the shortened map 360, and a list control 370. The shortened map 360 shows map details as in the full map 310 but also shows graphical details of at least part of a route between a start location and end location. The list control 370 shows text details and icons for directions along the route. FIGS. 4A-4C show example screenshots 401, 402, 403 of list views, each including a shortened map 360 and list control 370 as well as status information 320 (namely, time) that overlays the shortened map 360.

The screenshots 401, 402, 403 in FIGS. 4A-4C show different list views for a route between a start location and end location. In the screenshot 401 of FIG. 4A, a graphical icon 421 shows the current location along the route in the map portion of the list view. Part of the route 411 is shown in a highlighted color relative to the rest of the map data. The list control of the screenshot 401 includes waypoint icons 431, 432 and text details for waypoints along the route. Items in the list of directions are organized as waypoints, which represent points at which the user is given specific directions to turn, continue straight, take an exit, etc. Below the waypoint icons 431, 432, direction icons 441, 442 graphically represent the active part of the directions, e.g., to turn, continue straight, or take an exit associated with the respective waypoints. Distance values 451, 452 indicate the distance between waypoints (as in the distance 452 between waypoints 2 and 3) or distance between the current location and the upcoming waypoint (as in the distance 451 to waypoint 2).

The color of the waypoint icons 431, 432, text details, direction icons 441, 442 and distance values 451, 452 can change depending on the status of progress along the route. In FIG. 4A, the waypoint icon 431, text and direction icon 441 for waypoint 2 are rendered in an accent color to indicate waypoint 2 is the upcoming item in the list of directions. On the other hand, the waypoint icon 432, associated text and direction icon 442 for waypoint 3 are rendered in a neutral color to indicate waypoint 3 is further in the future.

The screenshot 402 of FIG. 4B shows the list view after the user scrolls to the end of the list of directions, which is graphically represented with text 462. Waypoint icon 433 represents a final waypoint in the map portion and list control of the list view. The map portion highlights part 412 of the route graphically. In the list control, the waypoint icon 433 is followed by text associated with the waypoint and a direction icon 443, but not a distance value since the waypoint is the final waypoint. The waypoint icon 433, associated text and direction icon 443 for the final, future waypoint are rendered in a neutral color.

The screenshot 403 of FIG. 4C shows the list view after the user scrolls back to the start of the list of directions, which is graphically represented with text 461. The map portion shows part 413 of the route graphically, but the completed part of the route is grayed out. Waypoint icon 434 represents an initial waypoint in the map portion and list control of the list view, and is also grayed out to show that the initial waypoint has been passed. Another waypoint icon 435 represents a subsequent waypoint. In the list control, space permitting, the waypoint icons 434, 435 are followed by text associated with the waypoints and direction icons 444, also grayed out, but no distance value since the waypoints have been passed. The list control also includes transit mode icons 472 that the user can actuate to switch between modes of transit (e.g., walking, vehicle, bus).

Example First Waypoint Distance Determination and Usage

The tools and techniques described herein allow a mobile computing device located in or on a moving vehicle to determine a first waypoint distance. A first waypoint distance is a route constraint provided in a map data request sent to a remote map server such that the first waypoint in a route returned by the server will be further away from the vehicle's location when the request was sent than the first waypoint distance. In other words, the first waypoint distance indicates a distance from a vehicle's location within which the first waypoint of a route cannot be located. By providing this constraint in a map data request, a mobile device user is less likely to be unable to follow the instruction to be taken at the route's first waypoint (first waypoint instruction). A user can fail to follow a first waypoint instruction because, for example, the vehicle has already passed the first waypoint when the route was received, or the user does have enough time to changes lanes, slow down or stop in order to make a turn or exit at the first waypoint. Thus, a first waypoint distance can be thought of as exclusionary zone route meeting the first waypoint distance constraint makes it more likely that a user will be able to follow a first waypoint instruction.

The first waypoint distance can be based on various factors, including a velocity of the mobile computing device, and one or more of a request latency time (the time it takes for the device to receive a route after sending a map data request to a map server), an instruction intake time (the time it takes for a user to listen to or read a first waypoint instruction), and an instruction time (the time it takes for a user to react to the first waypoint instruction). In some embodiments, the first waypoint distance is based on a device velocity, a request latency time, an instruction intake time and an instruction reaction time. In other embodiments, the first waypoint distance is based on a device velocity and the request latency time. In yet other embodiments, the first waypoint distance is based on a device velocity, a request latency time and either an instruction intake time or an instruction reaction time.

The route returned from the map server is provided to the mobile computing device in the form of route information. Route information comprises information that the mobile computing device can use to present a route at an output of the mobile computing device, and information about the one or more waypoints that comprise the route. The route information allows the device to present the route in the various forms described herein, including a map or list view.

Figure 5:
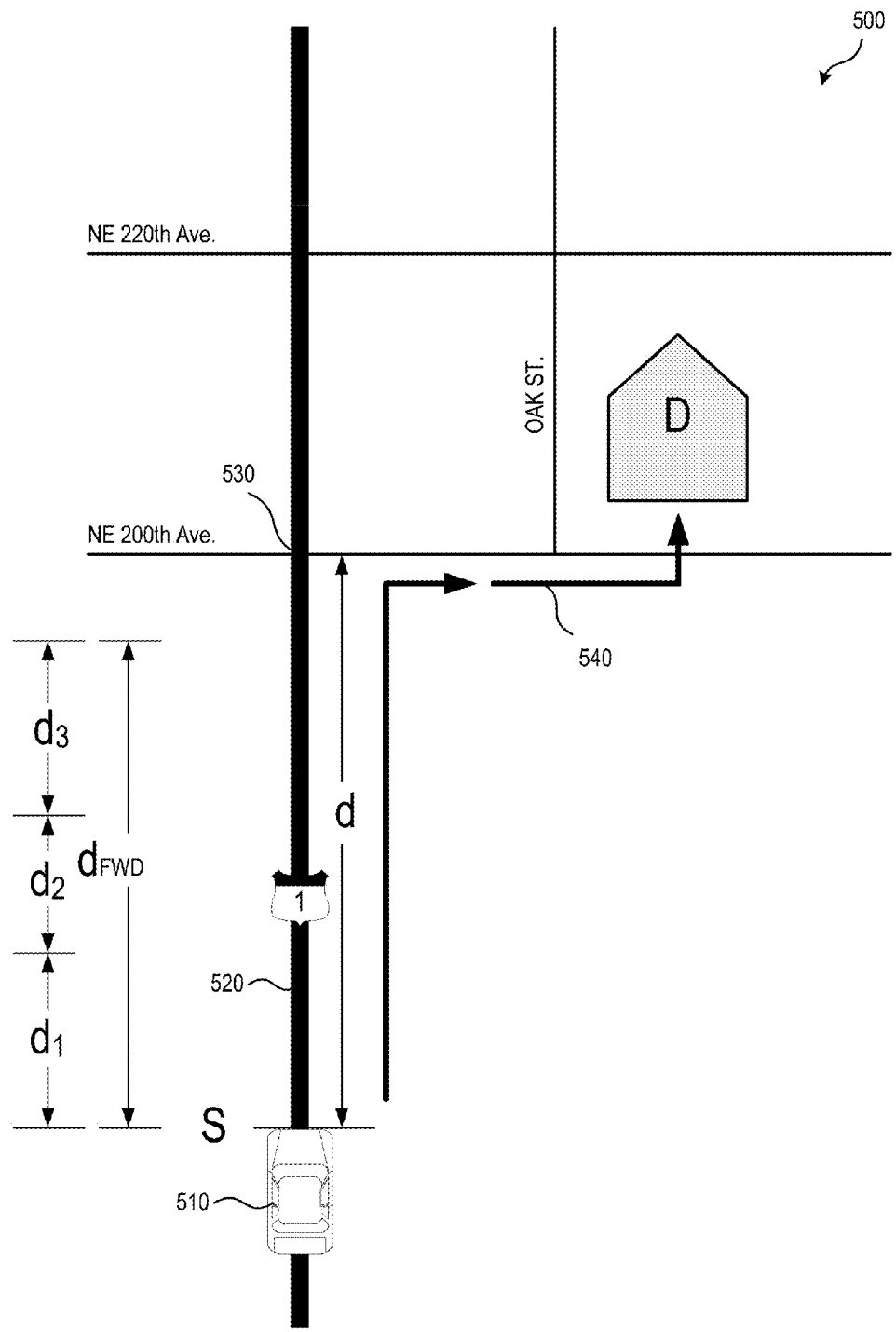
FIG. 5 is a diagram illustrating an exemplary first waypoint distance for a computing device located in a vehicle travelling down a highway.

FIG. 5 is a diagram 500 illustrating an exemplary first waypoint distance $d_{FWD}$ for a mobile computing device located in or on a vehicle 510 travelling down a highway 520 and requesting a route to a destination D. The first waypoint distance $d_{FWD}$ comprises component distances $d_1$, $d_2$ and $d_3$. The mobile computing device is located at a start location S when the map data request is made. Distance $d_1$ is the distance traveled by the vehicle 510 during a request latency time. The request latency time is the amount of time that elapses from the time that a mobile computing device sends a map data request to a server (which comprises a request for a route) to the time a server-provided route is received at the mobile device. Thus, the request latency time includes the time it takes for a map data request to travel from the mobile computing device to the server, the time it takes for the server to service the map data request (which can comprise the time it takes for the server to determine a route) and the time it takes for map data to be sent from the server and be received by the mobile device. The request latency time can depend on network availability, network congestion, server load and other similar factors.

The mobile computing device can use a predetermined value for the request latency time or a value based on actual, measured request latency times. For example, a mobile device can be configured to measure the amount of time that elapses from the transmission of a map data request to the receipt of route information. The mobile device can use a recently measured latency time, an average of recently measured request latency times or the result of any other calculation based on one or more recently measured latency times as the request latency time. Thus, the request latency time can vary in real time due to varying network congestion loads, the characteristics of the network route through which the map data request and response travels, server load and the like. In one example, a mobile computing device can assume a request latency time of 4 seconds to reflect a typical latency value for a map data request from the Virtual Earth® Bing Maps routing service provided by Microsoft®. In some embodiments, the request latency time can be set based on input provided by a user.

In some embodiments, the mobile computing device can determine that there is no network availability when the device desires to send a map data request to a server. In such situations, the mobile computing device can wait until it detects that a network is accessible again and recalculate the first waypoint distance. The first waypoint distance may have changed during the network unavailability due to, for example, the velocity of the device during network unavailability. Once the network is available, the mobile device can update its location and velocity, calculate an updated first waypoint distance, and send its updated location and the updated first waypoint distance to the server as part of a map data request.

Distance $d_2$ represents the distance traveled by the mobile computing device during an instruction intake time. An instruction intake time is an estimate of the amount of time it takes for a mobile device user to listen to or read a first waypoint instruction presented by the mobile computing device. Route instruction lengths can vary. Instructions can be relatively short (e.g., "Take Exit 10") or long (e.g., "Turn Right on Hollywood Boulevard"), regardless of whether they are presented aurally or visually. Some instructions take longer to present aurally than if read by a user, such as "Turn Right on NE 333rd Ave," the "333rd" portion of the instruction comprising many syllables. Accordingly, the instruction intake time can be an estimate of the time it takes an average user to listen to or read an instruction of an average length, a longer length or any other length. In one embodiment, the instruction intake time is set to two seconds to reflect an average instruction length. Additionally, instruction length can vary by language. In some embodiments, the computing device can automatically adjust the instruction intake time if the device determines that the language in which instructions are to be presented has been changed (for example, by the user modifying system- or application-level language settings).

Distance $d_3$ represents the distance that a mobile device travels during an instruction reaction time. An instruction reaction time is an estimate of the amount of time it takes for a mobile device user to react to a first waypoint instruction. Reacting to a first waypoint instruction comprises the mobile device user taking the actions necessary to execute the first waypoint instruction. For example, if the first waypoint instruction is "Take Exit NE 200th Ave," the instruction reaction time can comprise the time it takes for the user to change lanes and decelerate in order to make the exit. In another example, if the first waypoint is "Turn Left on Oak St.," the instruction reaction time comprises the time it takes for the user to come to a complete stop, if there is a stop sign or stoplight at the Oak St. intersection.

Instruction reaction times can depend on various conditions such as a mobile device user's level of driving experience, driving habits, weather conditions, time of day, traffic conditions or local road conditions. For example, inexperienced or cautious drivers may take more time to react to an instruction. A user may also need more time to react to an instruction if they are operating a vehicle at night, under inclement weather conditions (e.g., snow, rain, fog), are driving during rush hour (there is more traffic to cope with), if they are traveling on a highway (speed limits are higher and there are potentially more lanes to cross to reach an exit), if the velocity of the computing device exceeds a velocity threshold, if the roads are icy or if there is construction work being performed.

Instruction reaction times can be based on the time it takes an average user to react to an average first waypoint instruction. In one embodiment, the instruction reaction time is set to 4 seconds. In other embodiments, a mobile device can adjust the instruction reaction time to account for various factors. For example, the mobile device can increase the instruction reaction time if the device determines that the user is operating the vehicle at night (based on the current time and, optionally, the sunset or sunrise times for the current day), if the mobile device is traveling faster than a velocity threshold, if it is raining, snowing or foggy, if it is rush hour (based on the current time), or if the user is in the left-most lane of a multi-lane road. Information not stored locally at the computing device (e.g., sunset time, sunrise time, traffic conditions, weather conditions, number of lanes in a road) can be requested from a cloud-based service capable of supplying such information or from the mobile device user. For example, the mobile device can query the user about current weather, traffic, driving or other conditions. These requests can occur prior to a map data request being sent, on a periodic basis or at any other time. In some embodiments, the mobile computing device has information about the road on which it is traveling locally available because, for example, the user is traveling on a road that is part of a route already received from a server and lane information has been provided as part of the route.

In some embodiments, the map navigation tool can have various driving modes to which different instruction reaction times can be assigned. Such modes include night driving mode, work commute mode and the like. For example, in a night driving mode the instruction reaction time can be increased relative to an instruction reaction time when no particular driving mode is invoked or when the device is operating in a standard mode. The instruction reaction time in a work commute mode can similarly vary from the standard instruction reaction time and can be greater than, less than or the same as the night driving mode instruction time. Driving modes can be selected based on user input.

Alternatively, driving modes can have one or more operating conditions associated to each mode and the device can automatically select the driving mode if current operating conditions (e.g., time of day, weather conditions, traffic conditions) match those assigned to a particular driving mode. For example, the night driving mode has the associated operating condition that it be night. Accordingly, the device can automatically select the night driving mode when the device determines that it is night. If current operating conditions match those assigned to more than one mode, the device can enter into the mode having the more conservative (i.e., greatest) instruction reaction time. Operating conditions assigned to a mode can be modified by a user and the user can create or delete driving modes.

In some embodiments, the server can adjust the first waypoint distance received from a mobile device. The server can adjust the first waypoint distance based on information provided to the server as part of a map data request such as the location of the mobile device or on other information available to or accessible by the server. For example, based on the mobile computing device's location, the server can access traffic or weather conditions local to the computing device location, whether the mobile device user is traveling at night, or which lane the mobile device is travelling in. In some embodiments it may be more convenient for the server to adjust the first waypoint distance because, for example, the server has information such as sunset time, sunrise time, traffic and weather conditions stored locally or the server can access such information quicker than the mobile computing device.

A mobile computing device calculates the distances $d_1$, $d_2$ and $d_3$ based on the request latency time, the instruction intake time, and the instruction reaction time, respectively and a velocity of the computing device. Thus, if $t_1$, $t_2$ and $t_3$ are the request latency time, the instruction intake time and instruction reaction time, respectively, and v is the velocity of a mobile device, then $d_1 = v \ast t_1$, $d_2 = v \ast t_2$, $d_3 = v \ast t_3$, and $d_{FWD} = d_1 + d_2 + d_3$. The first waypoint distance can be set to zero if the computing device determines that it is not moving or is moving slower than a velocity threshold.

A mobile computing device can determine its velocity based on one or more recent location fixes (which can be performed using location determination techniques described herein) and the elapsed time between location fixes. The velocity used in calculating the first waypoint distance can be the instantaneous velocity of a computing device at the time a map data request is made, or an average device velocity determined over a recent time interval (e.g., the last 1, 5, 10, 15, 20 or 30 seconds). In some embodiments, the vehicle in which the computing device is traveling can provide its velocity to the computing device through a wired or wireless connection.

In some embodiments, the mobile computing device can allow a user to modify instruction intake or instruction reaction times. For example, if a user decides that he or she too often is unable to follow the first waypoint instructions, the user can increase the instruction intake and/or instruction reaction time to give himself or herself more time to react. Instruction intake and instruction reaction times can also be reduced by a user and computing devices can be configured to prevent the user from reducing the instruction intake or instruction reaction times below minimum values. The computing device can be configured such that one or more of the instruction latency time, instruction intake time and instruction reaction time are modified through software or firmware updates pushed to the mobile computing device by the mobile computing device manufacturer, the operating system provider, map navigation tool provider or any other party.

Returning to FIG. 5, in one example of a device requesting a route, a mobile computing device located in vehicle 510 traveling along highway 520 determines a start location S and a first waypoint distance $d_{FWD}$ and sends this information along with information identifying a destination D (e.g., latitude and longitude of the destination, destination address, destination name) to a server as part of a map data request. After receiving the map data request, the sever determines a route for the mobile device user to take to reach destination D that satisfies the constraint that the first waypoint in the route is further away from the device's start location (start location S) than the first waypoint distance $d_{FWD}$. In the example, the vehicle 510 is located at a distance d from intersection 530, which is greater than the first waypoint distance $d_{FWD}$. Thus, the server can provide a route 540 to the mobile device that contains intersection 530 as the first waypoint. Accordingly, the mobile device user should have enough time to make a right turn at intersection 530 after making the map data route request, receiving route information, listening or reading an instruction to turn right at NE 200th Ave, and taking the actions necessary to prepare for taking a right turn at NE 200th Ave., such as changing lanes and decelerating.

Figure 6:
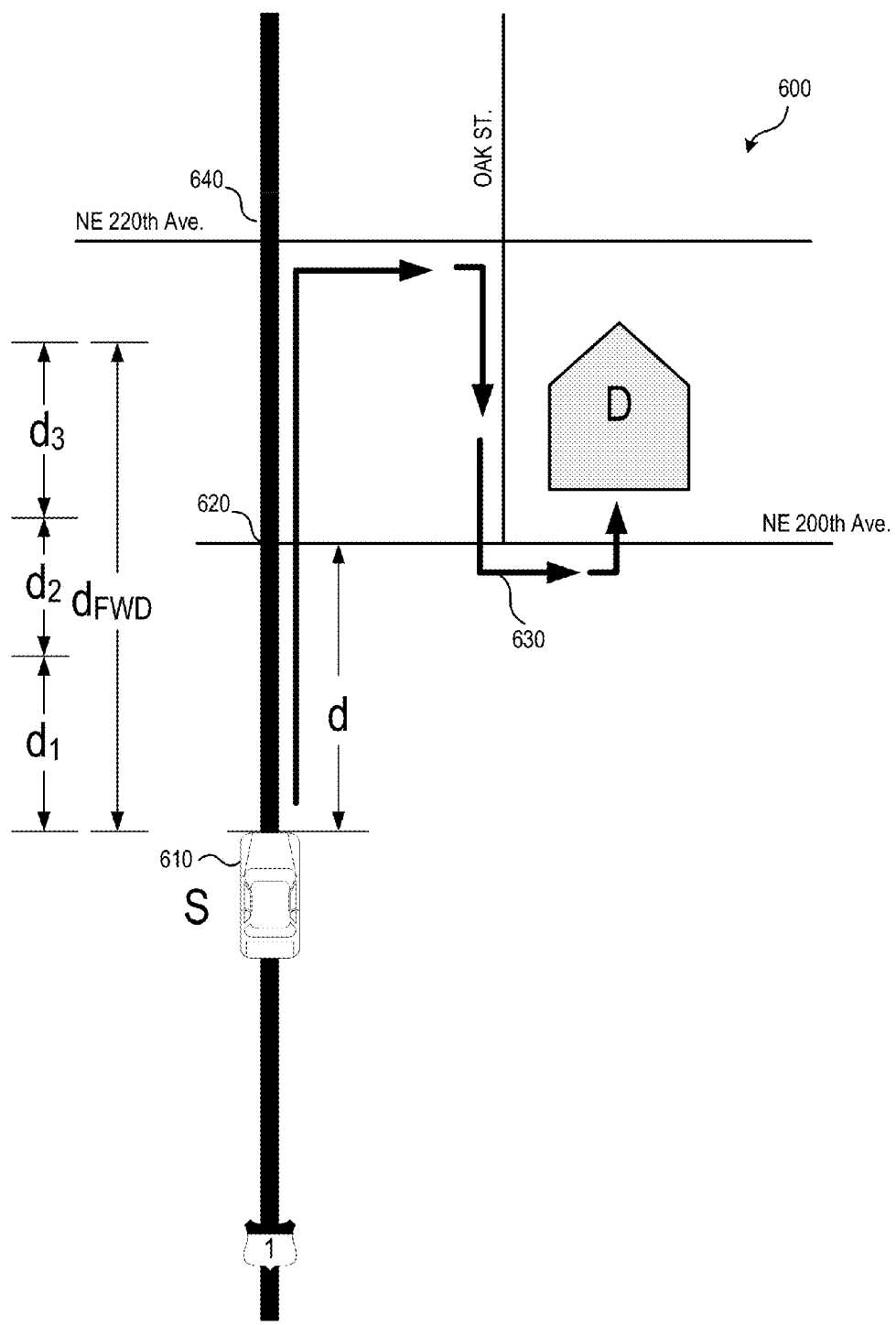
FIG. 6 is a diagram illustrating a situation where a vehicle being closer to an intersection than an exemplary first waypoint distance prevents the intersection from being a waypoint in a route.

FIG. 6 is a diagram 600 illustrating a situation where a vehicle 610 is closer to an intersection 620 than a first waypoint distance, thus preventing the intersection 620 from being a waypoint in a route. A mobile computing device in vehicle 610 determines the distance $d_{FWD}$ as described above and provides its current start location S, the first waypoint distance, and information identifying destination D to a server as part of a map data request. The server determines a route from S to D with the constraint that the first waypoint is at least a distance $d_{FWD}$ from start location S. Because the distance from S to intersection 620, the first available intersection where the vehicle 610 could make a turn toward destination D, the server does not include intersection 620 as a first waypoint. Instead, the server provides map data to the mobile computing device comprising information for a route 630 for the mobile device user to arrive at destination D. The first waypoint in the route 630 is intersection 640, which is located at a distance greater than $d_{FWD}$ from start location S.

Thus, by using the techniques and tools described herein, the server provides a route 630 to the computing device in vehicle 610 that did not include a first waypoint instruction to turn right at NE 200th Ave., an instruction that the user would have not been able to follow because the vehicle 610 would either have already passed intersection 620 when the device received route 630, or because there was not enough time for the user to listen to the first waypoint instruction and react in time to make turn onto NE 200th Ave.

The techniques and tools described herein can be used as part of a map data request sent by a mobile computing device from a server. In addition to the situations described above where a mobile device user requests a route to a destination from the mobile device's location, a first waypoint distance constraint can be placed on deviations requested from an existing route, or when a route needs to be recalculated (e.g., due to a user being off-route). For example, a mobile computing device can present a user with various points of interest along a route. If the user indicates to the mobile device that the user desires a route deviation to a selected point of interest, the device can calculate a new first waypoint distance and include this value as a part of a map data request for a route to the indicated point of interest. Other examples of where a computing device can send a map data route request comprising a first waypoint distance include the user selecting a new specific destination (e.g., a friend's home, a particular store or park) or a general destination (e.g., the nearest gas station).

Example Methods for Providing a Route to a Mobile Computing Device

Figure 7:
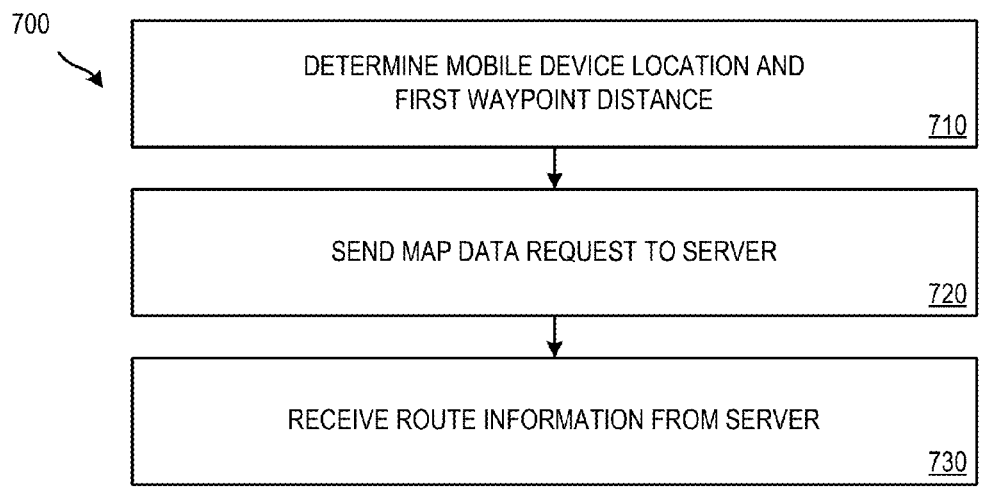
FIG. 7 is a flowchart of an exemplary method of requesting a route for a mobile computing device.

FIG. 7 is a flowchart of an exemplary method 700 of requesting a route for a mobile computing device. The method 700 can be performed by, for example, a smartphone located in a car being driven by a person heading to a friend's house. At 710, a mobile computing device location and a first waypoint distance is determined. The first waypoint distance indicates a distance from the mobile computing device location within which a first waypoint of a route cannot be located. In the example, the driver is heading in the general direction of his friend's house, but does not recall the exact direction to get there from the highway. The driver instructs his smartphone via, for example, a voice or touch interface, to provide directions to his friend's house. The smartphone determines the mobile computing device's location and a first waypoint distance, based on the velocity of the car, which is travelling at 70 miles per hour. The first waypoint distance is determined to be approximately 821 feet, the estimated distance the car travels in eight seconds (the sum of the current request latency time, instruction intake time and the instruction reaction time used by the mobile computing device).

At 720, a map data request is sent to a server. The map data request comprises the first waypoint distance and the mobile computing device location. In the example, the smartphone sends a map data request for a route from the smartphone's location to the friend's house to a server capable of generating routes. The request comprises the first waypoint distance of 821 feet. Either of the next two exits on the highway would take the driver in the direction of his friend's home. The first exit is one-tenth of a mile (528 feet) down the highway from the determined mobile computing device location, and the second is one-half of a mile (2,640 feet) down the highway. At 730, route information is received from the server. The route information comprises information identifying a received first waypoint that is a further away distance from the mobile computing device location than the first waypoint distance. In the example, the smartphone receives a route to his friend's house from the server. The first waypoint in the received route is the second highway exit as the first highway exit was within the first waypoint distance of the location of the smartphone when the request was sent. In some embodiments, the method 700 can include one or more of the following additional steps: storing the route at the mobile computing device, displaying a portion of the route including the first waypoint at a display of the mobile computing device, and presenting a first waypoint instruction.

Figure 8:
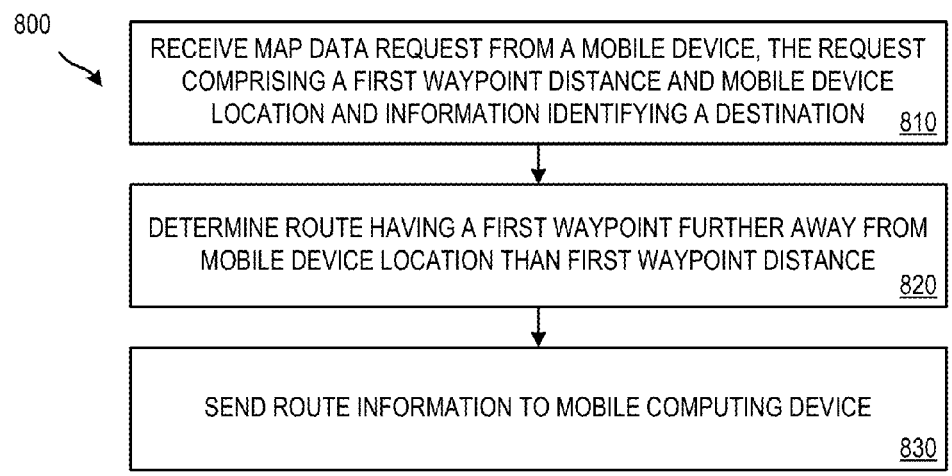
FIG. 8 is a flowchart of an exemplary method for providing a route to a mobile computing device.

FIG. 8 is a flowchart of an exemplary method 800 for providing a route to a mobile computing device. The method can be performed by, for example, a Bing Maps map server, which is capable of providing directions between two locations. At 810, a map data request is received from a slate device. The map data request comprises a first waypoint distance, a mobile device location and information identifying a destination. In the example, the Bing server receives a map data request from a slate device. The request comprises a first waypoint distance of 500 feet, the location of the slate device and a destination address. At 820, a route from the mobile device location to the destination is determined. The route comprises a first waypoint that is further away from the mobile device location than the first waypoint distance. In the example, the Bing server determines a route from the slate device location to the destination address. The first waypoint in the route is more than 500 feet away from the slate device location. At 830, route information corresponding to the route is sent to the mobile computing device. In the example, the Bing server sends the route to the slate device.

Alternatives and Variations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media (e.g., non-transitory computer-readable media, such as one or more optical media discs such as DVD or CD, volatile memory components (such as DRAM or SRAM), or nonvolatile memory components (such as hard drives)) and executed on a computer (e.g., any commercially available computer, including smart phones or other mobile devices that include computing hardware). Computer-readable media does not include propagated signals. Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

The disclosed methods, apparatus, and systems should not be construed as limiting in any way. Instead, the present disclosure is directed toward all novel and non-obvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method of requesting a route for a mobile computing device, using a processor, the method comprising:
   determining a mobile computing device location and a first waypoint distance, the first waypoint distance indicating a distance, representing an exclusionary zone, from the mobile computing device location within which a first waypoint of a route cannot be located, the first waypoint distance being based at least on a mobile computing device velocity;
   sending a map data request to a server, the map data request comprising the first waypoint distance and the mobile computing device location; and
   receiving route information from the server, the route information based on the first waypoint distance, the route information comprising information identifying a received first waypoint that is further away from the mobile computing device location than the first waypoint distance.

2. The method of claim 1, the first waypoint distance being further based on a request latency time.

3. The method of claim 2, the method further comprising:
   measuring one or more measured request latency times; and
   modifying the request latency time based on at least one of the one or more measured request latency times.

4. The method of claim 1, the first waypoint distance being based at least on the mobile computing device velocity and an instruction intake time the instruction intake time being an amount of time it takes for a user to listen to or read a first instruction in the route.

5. The method of claim 4, the method further comprising modifying the instruction intake time based on input received from a mobile device user.

6. The method of claim 1, the first waypoint distance being based at least on the mobile computing device velocity and an instruction reaction time.

7. The method of claim 6, the method further comprising modifying the instruction reaction time based on input received from a mobile device user.

8. The method of claim 6, the determining a first waypoint distance comprising determining a lane of a road that the mobile computing device is located in, the instruction reaction time being based at least in part on the lane that the mobile computing device is located in.

9. The method of claim 6, further comprising:
the mobile computing device determining that it is night; and
increasing the instruction reaction time.

10. The method of claim 6, further comprising:
determining that the velocity of the mobile computing device exceeds a velocity threshold; and
increasing the instruction reaction time.

11. The method of claim 1, the first waypoint distance being based at least on the mobile computing device velocity and one or more of a request latency time, an instruction intake time and an instruction reaction time, the instruction intake time being an amount of time it takes for a user to listen to or read a first instruction in the route.

12. A method of providing a route to a mobile computing device, using a processor, the method comprising:
receiving a map data request from the mobile computing device, the map data request comprising a first waypoint distance, a mobile device location and information identifying a destination, the first waypoint distance being based at least on a mobile computing device velocity;
based on the first waypoint distance, determining the route from the mobile device location to the destination, the route comprising a first waypoint that is further away from the mobile device location than the first waypoint distance; and
sending route information corresponding to the route to the mobile computing device.

13. The method of claim 12, further comprising modifying the first waypoint distance based on a time of day.

14. The method of claim 12, further comprising sending computer-executable instructions to the mobile computing device for causing the mobile computing device to perform a method, the method comprising:
determining the mobile computing device location and the first waypoint distance;
sending the map data request to a server, the map data request comprising the first waypoint distance and the mobile computing device location; and
receiving the route information from the server.

15. One or more computer-readable storage media storing computer-executable instructions for causing a mobile computing device to perform a method, the method comprising:
determining a mobile computing device velocity;
determining a mobile computing device location;
determining a first waypoint distance based on at least the mobile computing device velocity, a request latency time, an instruction intake time and an instruction reaction time, the instruction intake time being an amount of time it takes for a user to listen to or read a first instruction in a route;
sending a map data request to a server, the map data request comprising the first waypoint distance, the mobile computing device location, the request latency time, the instruction intake time and the instruction reaction time;
receiving route information from the server, the route information based on the first waypoint distance, the route information comprising information identifying a first waypoint that is further away from the mobile computing device location than the first waypoint distance; and
presenting, at a display of the mobile computing device, a portion of a route represented by the route information, the portion of the route including the first waypoint.

16. The one or more computer-readable storage media of claim 15, the method further comprising:
measuring one or more measured request latency times; and
modifying the request latency time based on at least one of the one or more measured request latency times.

17. The one or more computer-readable storage media of claim 15, the method further comprising:
the mobile computing device determining that it is night; and
increasing the instruction reaction time.

18. The one or more computer-readable storage media of claim 15, the method further comprising:
determining that the mobile computing device velocity exceeds a velocity threshold; and
increasing the instruction reaction time.

19. The one or more computer-readable storage media of claim 15, the method further comprising modifying the instruction reaction time based on input received from a mobile device user.

* * * * *